June 7, 1960 J. T. BECK 2,939,248
PROPAGATION CAPS
Filed Nov. 19, 1958
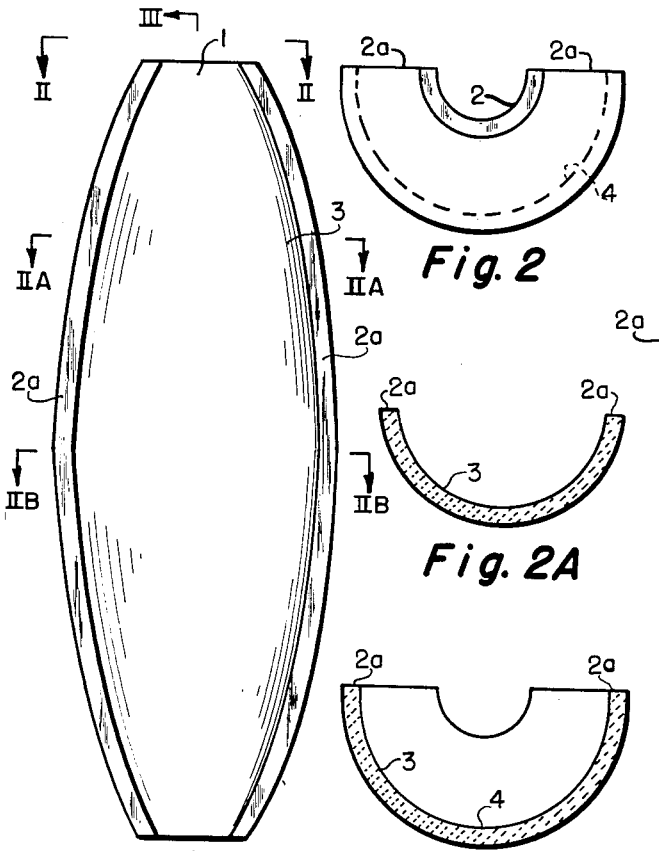
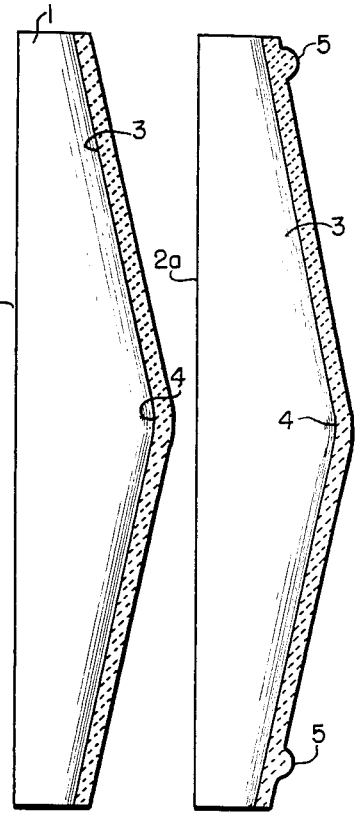
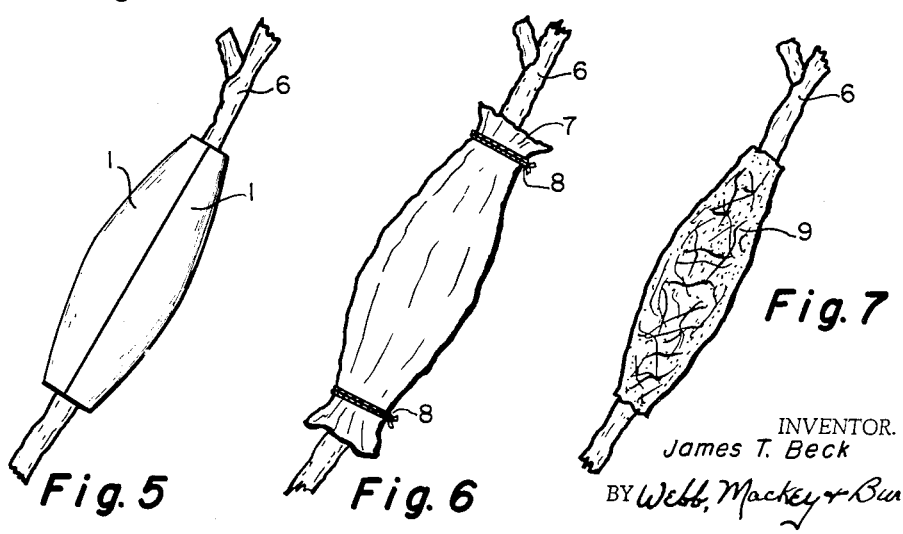
INVENTOR.
James T. Beck
BY Webb, Mackey & Burden
HIS ATTORNEYS United States Patent Office 2,939,248
Patented June 7, 1960

2,939,248

PROPAGATION CAPS

James T. Beck, P.O. Box 188, R.D. 5, Washington, Pa.

Filed Nov. 19, 1958, Ser. No. 775,020

5 Claims. (Cl. 47—37)

This invention relates to caps for use in propagating plants.

Plant nurseries require a simple and inexpensive method of propagating plants such as evergreens and trees. The present method utilized by the nurseries in propagating plants is to cut small clippings and branches from a plant, place the clippings in beds of rich dirt, and frequently water the bed until roots sprout from the plant. The cost of this method of plant propagation is extremely high due to the large watering expenses and large areas necessary for the beds. Furthermore, frequently less than 50% of the clippings ultimately result in new plants; due at least in part to insects, worms and moles eating the tender roots that sprout from the clippings.

The present invention obviates the above difficulties by providing an apparatus and method for propagating plants in which the watering costs are non-existent and the worms, insects and moles do not have an opportunity to eat the tender roots until they are well formed. Furthermore, the present invention permits the propagation of a much larger plant initially and thus the nursery owner realizes a quicker and larger profit on his endeavors. Furthermore, the present invention permits continued growth of the plant being propagated during the formation of roots which reduces the ultimate period of time that acreage is tied up in producing new plants.

I have described a present preferred embodiment of my invention in the accompanying drawings in which:

Figure 1 is a plan view of a propagation shell;

Figure 2 is an end view of a propagation shell;

Figure 2A is a cross section taken on line IIA—IIA of Figure 1;

Figure 2B is a cross section taken on line IIB—IIB of Figure 1;

Figure 3 is a longitudinal cross section taken on line III—III of Figure 1;

Figure 4 is a view similar to Figure 3 of a modified form of propagation shell;

Figure 5 is a view of a propagation cap positioned on a branch;

Figure 6 is a view of an outer water impervious wrapping on a propagation cap positioned on a branch; and Figure 7 is a view of a branch after the propagation cap has been removed.

Briefly, the present invention relates to a propagation cap including a pair of shells having a concave inner configuration and a convex outer configuration. The shells normally are of greater length than width and are identical in shape. The shells are filled with root-promoting material and positioned around a branch of a plant which one desires to propagate. The shells are then wrapped with a sheet of water impervious material and fastening means affixes the sheet and shells stationary relative to the branch. Within a relatively short period of time roots grow from the branch into the root-promoting material. The branch is then severed from the plant, the cap and sheet are removed, and a new plant has been formed.

Preferably, the propagation shells 1 have a somewhat oval plan view configuration, as shown in Figure 1, and are fabricated from any durable material which will retain a quantity of root-promoting material therein. Each shell has a semi-circular cut-out portion 2 at each end designated 2, as shown in Figure 2. The shell 1 also has an upper edge 2a for mating with an identical shell. The inside surface of the shell has an inside tapering longitudinal surface 3 which culminates in a central wider portion 4. The surface of the shells could be generated by two truncated cones affixed together at their bases.

Although the above-described shell configuration is the preferred form, it is understood that my invention is not so limited since the shells 1 can be of any shape such that when a pair of the shells are mated together in face to face relationship with the concave surfaces facing each other, a chamber is formed in which root-promoting material can be placed.

The shells 1 are fabricated from any material having sufficient rigidity to hold the root-forming material against the branch of the plant to be propagated. The shells 1, for example, are fabricated from plaster of Paris, rubber, tin, aluminum sheet, glass, wire screening or plastic. The preferable material of construction is plaster of Paris, due to its low lost and ease of fabrication.

The shells 1 are reusable if not broken. The shells can be hinged together to form a cap if desired.

The shells 1 are of any length or width and the walls of any thickness, providing the weight of the cap does not cause breakage of the branch to which it is affixed.

To use the shells, one shell is placed on each side of a branch 6 of a plant which one desires to propagate. The inner chamber formed by placing the two shells around the branch was previously filled with a root-promoting material such as peat moss, sphagnum moss, leaf mold, sand or dirt. The roots are promoted quicker by using leaf mold and sand. It is also desirable to use root-promoting hormones on the branch.

The shells 1 are used on any bush, tree or plant. Typical examples are tomato plants and fruit trees. On many trees branches 2 feet to 6 feet long have been successfully induced to grow roots by using the present method.

After the shells 1 have been positioned around the branch with the root-promoting material therein, the shells are preferably clamped or tied in position. Figure 4 shows a modified form of a shell containing small ridges 5 at the upper and lower ends of the shell. When string is used to tie the shells to the branch, the string engages the ridges 5 on each of the shells.

Whether or not the shell is tied to the branch, a sheet of water impervious material is wrapped around the shells and branch as shown in Figure 6. This water impervious material is aluminum sheeting, plastic sheeting or rubber sheeting for example. The root-promoting material had been moistened prior to its being placed in the shells 1 and the water impervious wrapping material will prevent the root-promoting material from drying out. Therefore, no further dampening of the root-promoting material is necessary until the roots are fully developed.

After the sheeting material has been applied, it is necessary to rigidly tie each end of the sheeting with any fastening means such as string 8.

The assembly shown in Figure 6 is then permitted to remain on the plant for at least one week and perhaps as long as three months until adequate roots have sprouted from the branch. The time period necessary to promote the root structure depends a great deal on the type of plant being propagated.

Figure 7 shows a root formation 9 after the sheeting and caps have been removed. The branch 6 is severed from the main plant and the roots 9 inserted into the ground in the area where one desires to grow the plant.

If the branch is ready to sever in the fall of the year, it is desirable to place the whole specimen, including the shells 1, the wrapping 7 and the branch 6 into the ground below the frost line. Then in the early following spring the entire specimen is dug up, the shells and sheeting are removed and the branch replanted with the roots open such as shown in Figure 7.

To further promote the formation of roots in the root-promoting material inside shells 1, it is desirable to make a small upwardly cut into the bark of the branch from which the roots can grow. This slit is entirely encased within the chamber formed by the shells 1 and the root-promoting material is pressed tightly against the slit by the shells 1.

It is readily seen from the above description that the mortality rate of specimens propagated by the present invention is extremely small since the roots are well formed prior to being placed in the ground and thus insects, worms and moles do not kill the specimen by eating the roots. Furthermore, the cost of watering the specimen is non-existent compared to the present propagation methods used by plant nurseries. The present invention will produce specimens which are identical to the original plant and the shells can be used on large branches thus permitting the nurseryman to gain a quicker profit than had been previously possible. Last, but not least, the branch continues to grow on the main plant during the root formation period. In the present known methods of propagation the growth of the specimen which is inserted in the ground to sprout roots is stopped during an extensive period of time while the roots are forming.

While I have described a present preferred embodiment of my invention, it may be otherwise embodied within the scope of the following claims.

I claim:

1. A propagation cap for use in promoting the growth of roots on branches of plants including a pair of hollow, oval, cup-shaped shells, each shell having side walls on three sides, a top and a bottom; each shell having a semi-circular cross-section, the upper and lower ends of each shell having semi-circular cross-sections of lesser radius than the cross-section at the midpoint between the ends, said shells being positioned in face-to-face contiguous relationship to each other around said branch when in use to form a receptacle having continuous imperforate side walls and a top and bottom, a portion of said top and bottom of the receptacle being removed to permit ingress and egress of the branch; the inside of the receptacle being adapted to be filled with root promoting material; and the shells being fastened stationary relative to each other and to branch such that roots will grow from the branch into the root promoting material and the branch can then be severed from the plant to form a self-sustaining second plant.

2. A propagation cap according to claim 1 including a water impervious sheet material wrapped around and completely enclosing the shells on the branch; and fastening means to maintain the material in wrapped position around the shells.

3. A propagation cap according to claim 1 wherein said shells have a concave inside and a convex outside.

4. A propagation cap according to claim 1 wherein said shells have a transverse ridge affixed to their outer surfaces at both top and bottom walls, said ridge being adapted to be engaged by a fastening means which maintains the shells stationary relative to each other.

5. An apparatus as recited in claim 1 wherein said shells are fabricated from a material selected from the group consisting of plaster, rubber, tin, aluminum, glass and plastic; and the root promoting material is selected from the group consisting of peat moss, sphagnum moss, leaf mold, sand and dirt.

References Cited in the file of this patent

UNITED STATES PATENTS

| | | |
|---|---|---|
| 1,655,731 | May | Jan. 10, 1928 |
| 1,774,019 | Lam | Aug. 26, 1930 |
| 1,868,609 | Lam | July 26, 1932 |
| 2,021,793 | Lam | Nov. 19, 1935 |
| 2,572,473 | Grove | Oct. 23, 1951 |
| 2,786,306 | Eaton | Mar. 26, 1957 |

FOREIGN PATENTS

| | | |
|---|---|---|
| 340,470 | France | May 14, 1904 |
| 414,111 | France | June 10, 1910 |